United States Patent [19]

Rosenberg

[11] Patent Number: 4,474,207
[45] Date of Patent: Oct. 2, 1984

[54] PRESSURE REGULATOR

[76] Inventor: Peretz Rosenberg, Moshav Beit Shearim, Israel

[21] Appl. No.: 62,469

[22] Filed: Jul. 31, 1979

[30] Foreign Application Priority Data

Apr. 23, 1979 [IL] Israel ........................................ 57119

[51] Int. Cl.$^3$ ............................................. F16K 31/12
[52] U.S. Cl. .................................... 137/505; 137/220; 137/505.28
[58] Field of Search ............. 137/219, 220, 509, 505.28

[56] References Cited

U.S. PATENT DOCUMENTS

| | | | |
|---|---|---|---|
| 2,069,022 | 1/1937 | Sisk | 137/505 X |
| 2,265,435 | 12/1941 | Kinzie | 137/219 |
| 2,727,530 | 12/1955 | Grove | 137/505.28 |
| 2,888,033 | 5/1959 | Eickmeyer | 137/505 |
| 3,495,607 | 2/1970 | Shugarman | 137/505.28 X |
| 3,559,677 | 2/1971 | Barosko | 137/505.28 X |

Primary Examiner—Harold W. Weakley
Attorney, Agent, or Firm—Benjamin J. Barish

[57] ABSTRACT

A fluid pressure regulator is described including a movable regulator member and means biassing same to its fully-open position, the regulator member being exposed to the outlet pressure for moving same in the opposite direction and including a pressure-sensor surface portion which, when the regulator member is in its fully-open position, engages an inner face of the housing such as to reduce the effective area of the pressure-sensor surface. The regulator member is thus retained in its fully-open position by the biassing means until the actual outlet pressure exceeds the regulated value by a preselected pressure differential, at which time the regulator member is moved by the outlet pressure away from its fully-open position, thereby making effective its complete pressure-sensor surface to thereafter regulate the outlet pressure.

7 Claims, 6 Drawing Figures

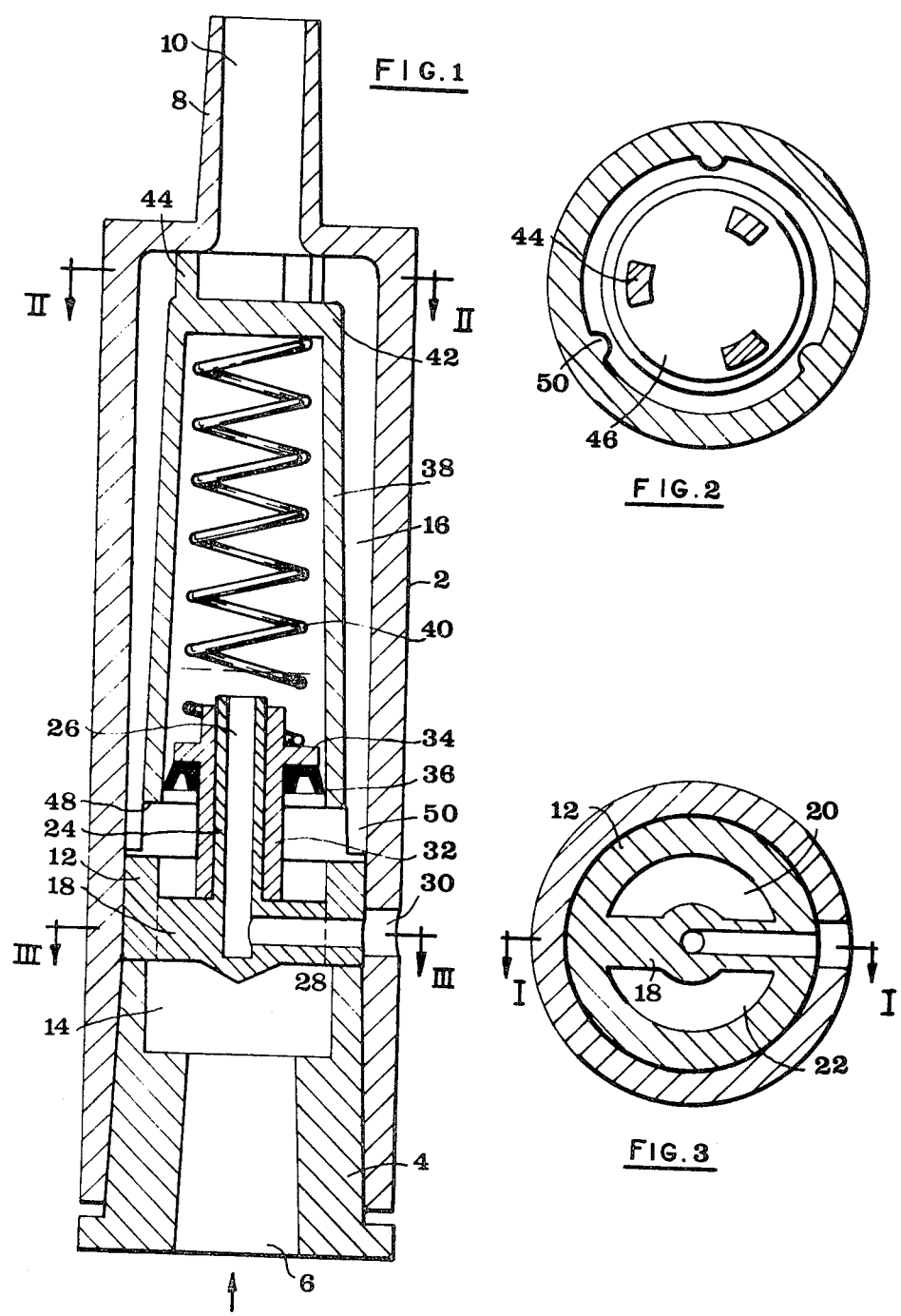

PRESSURE REGULATOR

BACKGROUND OF THE INVENTION

The present invention relates to pressure regulators, and particularly to the type commonly used for regulating the flow of a fluid, e.g., water in an irrigation system, to maintain a substantially constant outlet pressure.

Fluid pressure regulators generally include a housing having an inlet chamber, an outlet chamber, a connecting passageway connecting the two chambers, and a movable regulator member biassed in one direction to a position fully-opening the passageway but including a pressure-sensor surface exposed to the pressure in the outlet chamber for moving the regulator member in the opposite direction to restrict the passageway in response to the outlet pressure, and thereby to maintain the outlet pressure at a predetermined regulated value. Many different constructions are known, but as a rule the regulator member in the known constructions begins to move to restrict the passageway before the outlet pressure reaches the predetermined regulated value. Thus, if the inlet pressure is below or substantially equal to the desired regulated outlet pressure, the regulator nevertheless produces a pressure drop. This is particularly undesirable with respect to low inlet pressures where the pressure drop across the regulator is to be minimized.

An object of the present invention is to provide a fluid pressure regulator of improved construction which minimizes the pressure drop across the regulator particularly at low inlet pressures.

SUMMARY OF THE INVENTION

According to a broad aspect of the present invention, there is provided a fluid pressure regulator of the foregoing type but characterized in that the pressure-sensor surface of the regulator member includes a surface portion which, when the regulator member is in its fully-open position, engages an inner surface of the housing such as to reduce the effective area of the pressure-sensor surface of the regulator member by said surface portion, whereby the regulator member is retained in its fully-open position by the biasing means until the actual outlet pressure exceeds the predetermined regulated value by a preselected pressure differential, at which time the regulator member is moved by the outlet pressure away from its fully-open position thereby making effective its complete pressure-sensor surface to thereafter regulate the outlet pressure.

It will thus be seen that for low inlet pressures up to the predetermined regulated value, there will be a minimum pressure drop since the regulator member will not begin to move to restrict the passageway until the actual outlet pressure exceeds the predetermined regulated value by a predetermined pressure differential. This pressure differential may be fixed according to the area of the pressure-sensor surface of the regulator member which is made inactive in the fully-open position of the regulator member, i.e. the surface portion which engages the inner face of the housing so as to reduce the effective area of the pressure-sensor surface subjected to the outlet pressure. This surface portion of the regulator member which is thus made inactive can be produced in a relatively simple manner, e.g., by including one or more projections on the pressure-sensor surface of the regulator member which projections are engageable with a flat surface on the inner face of the housing when the regulator member is in its fully-open position. It will be appreciated, however, that the same effect can be produced by providing the projections on the inner face of the housing to engage a flat pressure-sensor surface of the regulator member in the fully-open position of the latter.

Several preferred embodiments of the invention are described below in which the regulator includes a cylinder and a piston, one of which is fixed with respect to the housing, and the other of which constitutes the movable regulator member biassed by a spring in the direction to fully-open the passageway, the space within the cylinder being vented to the atmosphere.

In two described embodiments, the cylinder constitutes the movable regulator member and includes a closed end having at least one projection constituting said pressure-sensor surface portion engageable with the inner face of the housing, the open end of the cylinder being effective to fully-open or to restrict said passageway upon the movement of the cylinder by the outlet pressure.

In the second described embodiment, the cylinder is fixed with respect to the housing, the piston constituting the movable regulator member and including said projection engageable with the inner face of the housing when the piston is in its fully-open position.

BRIEF DESCRIPTION OF THE DRAWINGS

FIG. 1 is a longitudinal sectional view (being taken along lines I—I of FIG. 3) of one form of fluid pressure regulator constructed in accordance with the invention;

FIGS. 2 and 3 are transverse sectional views, along lines II—II and III—III, respectively, of FIG. 1;

DESCRIPTION OF PREFERRED EMBODIMENT

Figure 4:
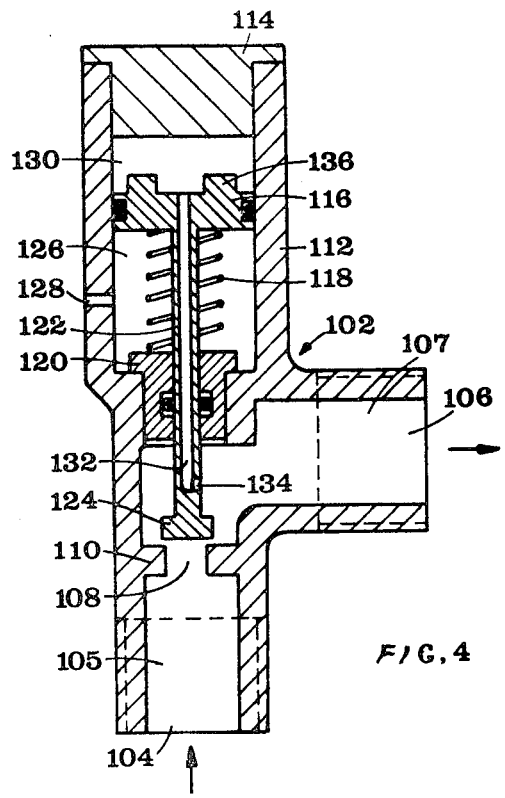
FIG. 4 is a longitudinal sectional view illustrating another form of fluid pressure regulator constructed in accordance with the invention.

The fluid pressure regulator illustrated in FIGS. 1-3 of the drawings is in the form of a fitting adapted to be attached in-line to a fluid pressure line. Such pressure regulators are commonly included in water irrigation supply lines to maintain a substantially constant inlet pressure to the irrigation devices, e.g., sprinklers or drippers, and thereby to provide substantially uniform outputs from all the devices despite fluctuations in the inlet pressure, differences in the location of the devices in the line, and differences in the altitude of the devices in the line.

The pressure regulator illustrated in FIGS. 1-3 comprises a cylindrical housing, generally designated 2, frictionally-receiving a conical plug 4 at one end. Plug 4 is formed with a conical bore 6 defining the inlet to the regulator and adapted to be frictionally connected to the upstream pipe (not shown). The opposite end of housing 2 is formed with a conical stem 8 having a bore 10 therethrough serving as the outlet of the regulator, stem 8 being frictionally attachable to the downstream pipe (not shown).

Disposed within housing 2 is an annular ring 12 dividing the interior of housing 2 into an inlet chamber 14 and an outlet chamber 16. Annular ring 12 is formed with a diametrically extending web 18 (see FIG. 3)

defining, on opposite sides, two openings 20, 22 connecting the inlet chamber 14 to the outlet chamber 16. Annular ring 12 is further formed with an upstanding stem 24 having a vertical bore 26 communicating at its lower end with a horizontal bore 28 formed through one-half of the web 18 in alignment with a bore 30 formed through the housing 2.

Stem 24 receives a sleeve 32 formed at its upper end with a head 34 carrying a sealing-ring 36 engageable with the inner face of a cylinder 38. Head 34, together with its sealing ring 36, constitutes a piston cooperable with cylinder 38, the piston being fixed (via stem 24 and ring 12) with respect to the housing, and the cylinder (38) being movable with respect to the piston. The interior of cylinder 38 is vented to the atmosphere via vertical bore 26 through stem 32, horizontal bore 28 through web 18, and bore 30 through the housing wall. A coil spring 40 interposed between end wall 42 of cylinder 38 and piston 34 biasses the cylinder upwardly, i.e. towards the housing outlet 10 and away from ring 12.

End wall 42 of cylinder 38 is further formed with three projections 44 which, under the bias of spring 40, are pressed into engagement with the inner face of housing 2. The end faces of projections 44 are flat so as to firmly abut against the inner face of housing 2. As shown particularly in FIG. 2, the projections 44 are symmetrically spaced around the longitudinal axis of cylinder 38 to provide passages 46 for the flow of the fluid.

In the position of cylinder 38 illustrated in FIG. 1, the lower face 48 of cylinder 38 is normally spaced, under the bias of spring 40, away from the upper face of the annular ring 12. This is the fully-open position of cylinder 38, wherein it is biased by spring 40 to provide a maximum cross-sectional area for the fluid to flow from the inner chamber 14 to the outer chamber 16. The passageway for this flow of the fluid is constituted by the space between the upper face of ring 12 and the lower face 48 of cylinder 38. Countering the force of spring 40 is the force applied to cylinder 38 by the pressure at the outlet 10, which latter force tends to move cylinder 38 against the bias of spring 40 to restrict the passageway between the lower face 48 of the cylinder and the upper face of ring 12, thereby to maintain the outlet pressure at a predetermined regulated value.

The inner face of housing 2 is preferably formed with ribs 50 (see FIG. 2) which guide the movement of cylinder 38 with respect to piston 34 under the influence of the outlet pressure against the force of spring 40. The lower ends of ribs 50 form abutments engageable with the upper face of ring 12 which ring is securely retained within the housing between the ends of the ribs and the conical plug 4. Preferably, cylinder 38 is also of conical configuration, being of slightly smaller diameter at the top wall 42 than at the bottom face 48.

The pressure regulator illustrated in FIGS. 1-3 operates as follows: The fluid introduced at the inlet 6 of the regulator flows from the inlet chamber 14 through openings 20, 22 of ring 12, through the annular space between the ring and the lower face 48 of cylinder 38, through the outlet chamber 16 around cylinder 38, and through the spaces 46 between the projections 44 to the outlet 10. Spring 40 biasses cylinder 38 to the position illustrated in FIG. 1, wherein projections 44, formed in the end wall 42 of the cylinder 38, engage the inner face of housing 2. As indicated above, this is the fully-open position of the regulator wherein the passageway between annular ring 12 and the lower face 48 of cylinder 38 is of maximum cross-section. The force applied by spring 40 is countered by the outlet pressure applied to the outer face of cylinder 38, particularly its end wall 42, which force tends to move the cylinder in the opposite direction, i.e., to restrict the passageway between the lower face 48 of the cylinder and the upper face of ring 12.

When the regulator is in its fully-open position as illustrated in FIG. 1, engagement of the end faces of projections 44 with the inner face of housing 2 reduces the effective area of the pressure-sensor surface of cylinder 38 subjected to the outlet pressure, whereby the cylinder 38 is retained in its fully-open position by spring 40 until the actual outlet pressure exceeds the predetermined regulator value by a preselected pressure differential. This pressure differential is dependent upon the area of the end faces of projections 44 relative to the total pressure-sensor surface of cylinder 38. When the cylinder 38 is conical as illustrated in FIG. 1, the total pressure-sensor surface subject to the outlet pressure would be the area of the maximum diameter portion of the cylinder, i.e., its lower face 48.

As soon as the preselected presure differential has been exceeded, cylinder 38 is moved by the outlet pressure away from its fully-open position, i.e., in the direction bringing the lower face 48 of cylinder 38 closer to the upper face of ring 12. When the end faces of projections 44 move away from the inner face of housing 2, the surface area of the projection end faces becomes subjected to the outlet pressure, thereby making the complete pressure-sensor surface, including this area, effective to thereafter regulate the outlet pressure.

It will thus be seen that the cylinder remains in its fully-open position until the actual outlet pressure exceeds the regulated value, thereby minimizing the pressure drop at low inlet pressures.

FIG. 4 illustrates a variation, wherein the movable regulator member is a piston movable in a cylinder which is fixed with respect to the housing, rather than vice versa as in the above-described FIGS. 1-3 embodiment.

Thus, the housing in FIG. 4, therein generally designated 102, includes a fluid inlet 104 leading into an inlet chamber 105, a fluid outlet 106 leading from an outlet chamber 107, and a passageway 108 interconnecting the two chambers together, the passageway being defined by an internal annular shoulder 110. Housing 102 is formed with a cylindrical extension 112 closed by a plug 114. A piston 116 is disposed within cylindrical extension 112 and is biassed towards plug 114 by a spring 118 interposed between piston 116 and another plug 120 received in the lower end of cylindrical housing extension 112.

Piston 116 is carried at one end of a stem 122. This stem passes through plug 120 and carries, at its opposite end, a valve member 124 movable towards and away from passageway 108 to vary the cross-sectional area thereof, and thereby to control the flow of the fluid therethrough from inlet 104 to outlet 106. The chamber 126 defined by the plug 120 and the lower face of piston 116 is vented to the atmosphere via a bore 128 formed through cylindrical housing section 112. The chamber 130 defined by the upper face of piston 116 and the lower face of plug 114 communicates with the pressure at the outlet 106 via a longitudinal bore 132 formed through piston 116 and its stem 122, and a transverse bore 134 formed through the lower end of the stem. The upper face of piston 116 is provided with a projecting surface 136 which is engageable, under the influence of spring 118, with the inner face of plug 114.

It will thus be seen that piston 116, including its stem 122 and flow control member 124, corresponds to the movable cylindrical regulator member 38 in the FIGS. 1-4 embodiment. Thus, the piston is biassed to fully-open the passageway 108 by spring 118 but includes a pressure-sensor surface (namely the complete upper surface of piston 116 facing plug 114) which is exposed (via bores 132, 134) to the pressure in the outlet chamber 106 for moving the flow control member 124 in the direction to restrict the passageway 108 in response to the outlet pressure. Projection 136 in the upper face of piston 116 constitutes the pressure-sensor surface portion which is inactive in moving the piston until the outlet pressure exceeds the predetermined regulated value by a preselected pressure differential. Thus, the projecting surface 136 may also take the form of separately-spaced projections, similar to projections 44 formed in the movable cylinder 38 of FIG. 1. However, since this projecting surface 136 is not in the path of the flow of the fluid to the outlet, as it is in the embodiment of FIGS. 1-3, the projecting surface 136 may be of continuous annular configuration having a flat face engageable with the flat inner face of plug 114. The latter plug constitutes part of the housing 102, and the cylindrical extension 112 of housing 102 constitutes a fixed cylinder within which piston 116 moves.

The regulator illustrated in FIG. 4 thus operates basically in the same manner as described above with respect to FIGS. 1-3, except that in FIG. 4 the piston 116 moves and the cylinder 112 is fixed with respect to the housing 102, whereas the opposite is true in FIGS. 1-3. Thus, when the inlet pressure in the regulator of FIG. 4 is below the predetermined regulated value, spring 118 urges piston 116 against the inner face of housing plug 114, so that the flat surface of the annular projection 136 becomes inactive in influencing the movement of the piston, and only its inner surface within the annular projection 136 is subjected to the outlet pressure transmitted thereto via bores 134 and 132. The piston 116, together with the flow control member 124 carried thereby via the stem 122, will therefore remain in the fully-open position with respect to passageway 108 until the actual outlet pressure exceeds the predetermined regulated value by a preselected pressure differential, at which time piston 116 will move away from housing plug 114. As soon as this occurs, the flat surface of projection ring 136, having moved away from the inner face of the housing plug 114, becomes subjected to the outlet pressure to that the complete upper face of piston 116 thereafter becomes effective to move the flow control member 124 with respect to passageway 108, and thereby to regulate the outlet pressure.

Figure 5:
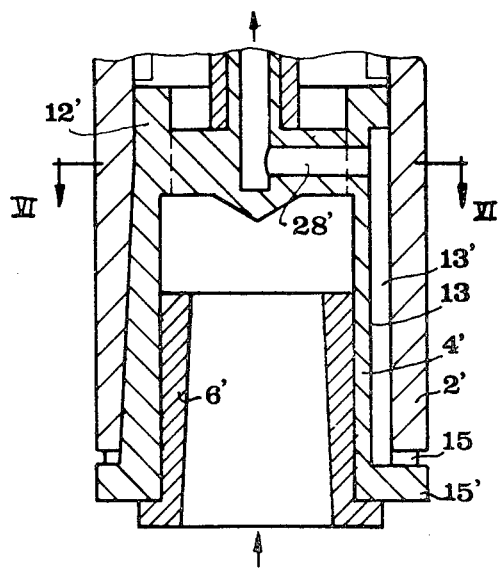
FIG. 5 is a fragmentary view showing a modification in the construction of FIG. 1.
Figure 6:
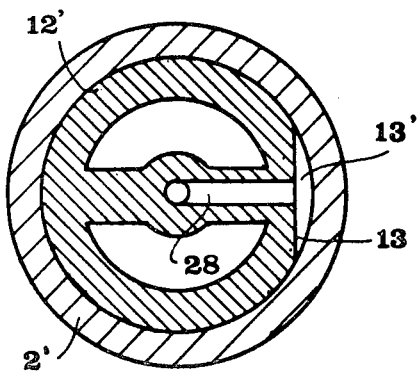
FIG. 6 is a sectional view along lines VI—VI of FIG. 5.

FIGS. 5 and 6 illustrate a modification to the construction of FIGS. 1-3. To facilitate a comparison corresponding parts carry the same reference numerals but with a "prime" mark. Thus, the plug 4' is formed integrally with the annular ring 12', and is further formed with a flattened face 13 extending from the horizontal bore 28' to the bottom of housing 2'. The latter is formed with a plurality of circumferentially-spaced short ribs 15 engagable with a flange 15' at the lower end of plug 4', to define a venting passageway 13' from bore 28' to the exterior of the housing 2'. In addition, a tapered connector 6' is frictionally fitted into the end of plug 4' for connection to the upstream pipe (not shown). The construction of the fluid pressure regulator illustrated in FIGS. 5 and 6 is otherwise the same as described above with reference to FIGS. 1-3.

While the invention has been described with respect to two preferred embodiments, it will be appreciated that these are described purely for purposes of example, and that the invention may take other forms. For example, instead of using a piston-cylinder arrangement for effecting the regulation, the regulator member may be in the form of a diaphragm. Many other variations, modifications and applications of the invention will be apparent.

What is claimed is:

1. A fluid pressure regulator including a housing having an inlet chamber, an outlet chamber, a connecting passageway connecting the two chambers, a piston fixed with respect to the housing, and a regulator cylinder movable with respect to said fixed piston and biassed in one direction to a position fully-opening the passageway but including a closed end constituting a pressure-sensor surface exposed to the pressure in the outlet chamber for moving the regulator cylinder in the opposite direction to restrict the passageway in response to the outlet pressure, and thereby to maintain the outlet pressure at a predetermined regulated value, the space within the cylinder being vented to the atmosphere; characterized in that said closed end of the regulator cylinder includes a surface portion which, when the regulator cylinder is in its fully-open position, engages an inner face of the housing such as to reduce the effective area of the pressure-sensor surface of the regulator cylinder by said surface portion, whereby the regulator cylinder is retained in its fully-open position by the biassing means until the actual outlet pressure exceeds the predetermined regulated value by a preselected pressure differential, at which time the regulator cylinder is moved by the outlet pressure away from its fully-open position thereby making effective its complete pressure-sensor surface to thereafter regulate the outlet pressure.

2. A regulator according to claim 1, wherein the closed end of the regulator cylinder includes at least one projection constituting said pressure-sensor surface portion engageable with the inner face of the housing when the regulator cylinder is in its fully open position, the open end of the cylinder being effective to restrict said passageway upon the movement of the cylinder by the outlet pressure.

3. A regulator according to claim 2, wherein said closed end of the cylinder is adjacent to the exit end of the outlet chamber and includes a plurality of spaced projections symmetrically spaced around the longitudinal axis of the cylinder to permit the fluid to exit therebetween when the cylinder is in its fully-open position.

4. A regulator according to claim 2, wherein said fixed piston includes a stem formed with a bore venting the space within the cylinder to the atmosphere.

5. A regulator according to claim 2, wherein the inner face of the housing includes ribs guiding the movement of the cylinder with respect to the fixed piston.

6. A regulator according to claim 4, wherein the space within the cylinder is vented to the atmosphere via a bore formed through said stem and through the housing wall.

7. A regulator according to claim 4, wherein said fixed piston includes a plug inserted into the housing and formed with a flat outer face defining a space between it and the inner face of the housing, the space within the cylinder being vented to the atmosphere via a bore formed through said stem leading to said space between the plug and the housing.

* * * * *